No. 647,251. Patented Apr. 10, 1900.
G. H. CONDICT.
STORAGE BATTERY SUSPENSION FOR MOTOR VEHICLES.
(Application filed July 30, 1898.)
(No Model.) 3 Sheets—Sheet 1.
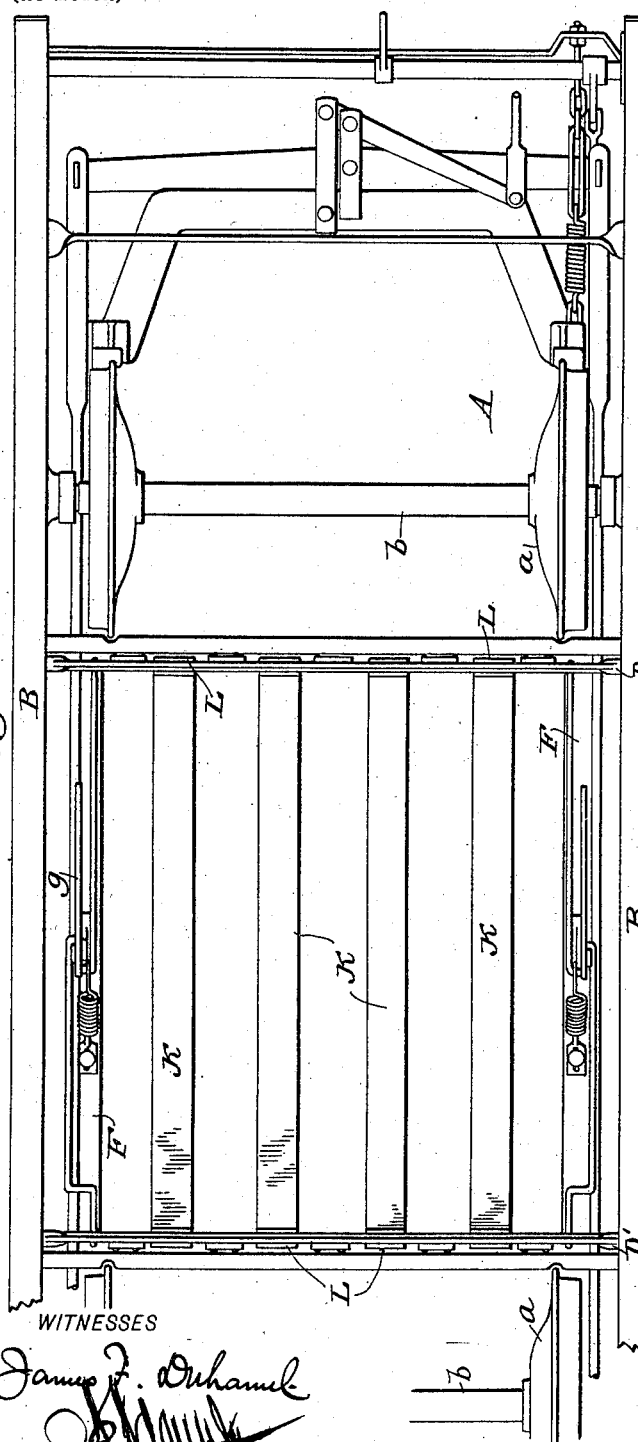
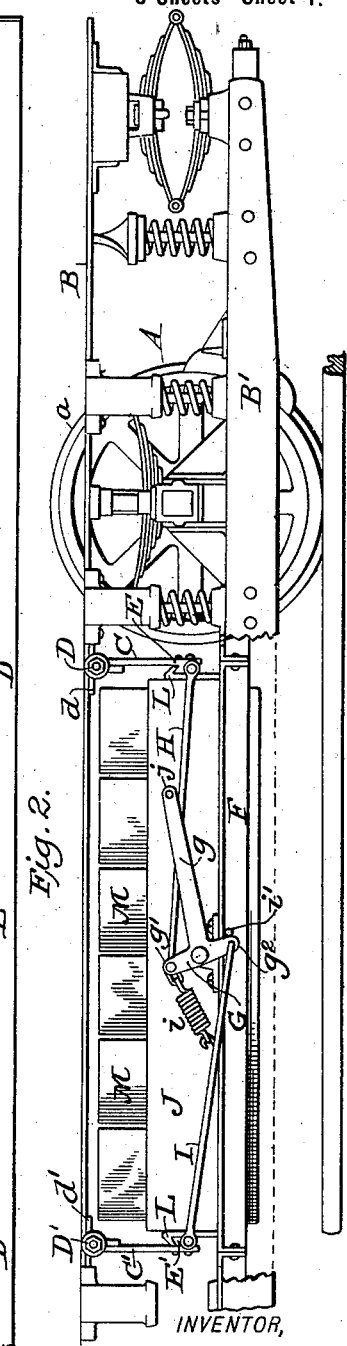
WITNESSES
INVENTOR,
George Herbert Condict,
BY
ATTORNEY

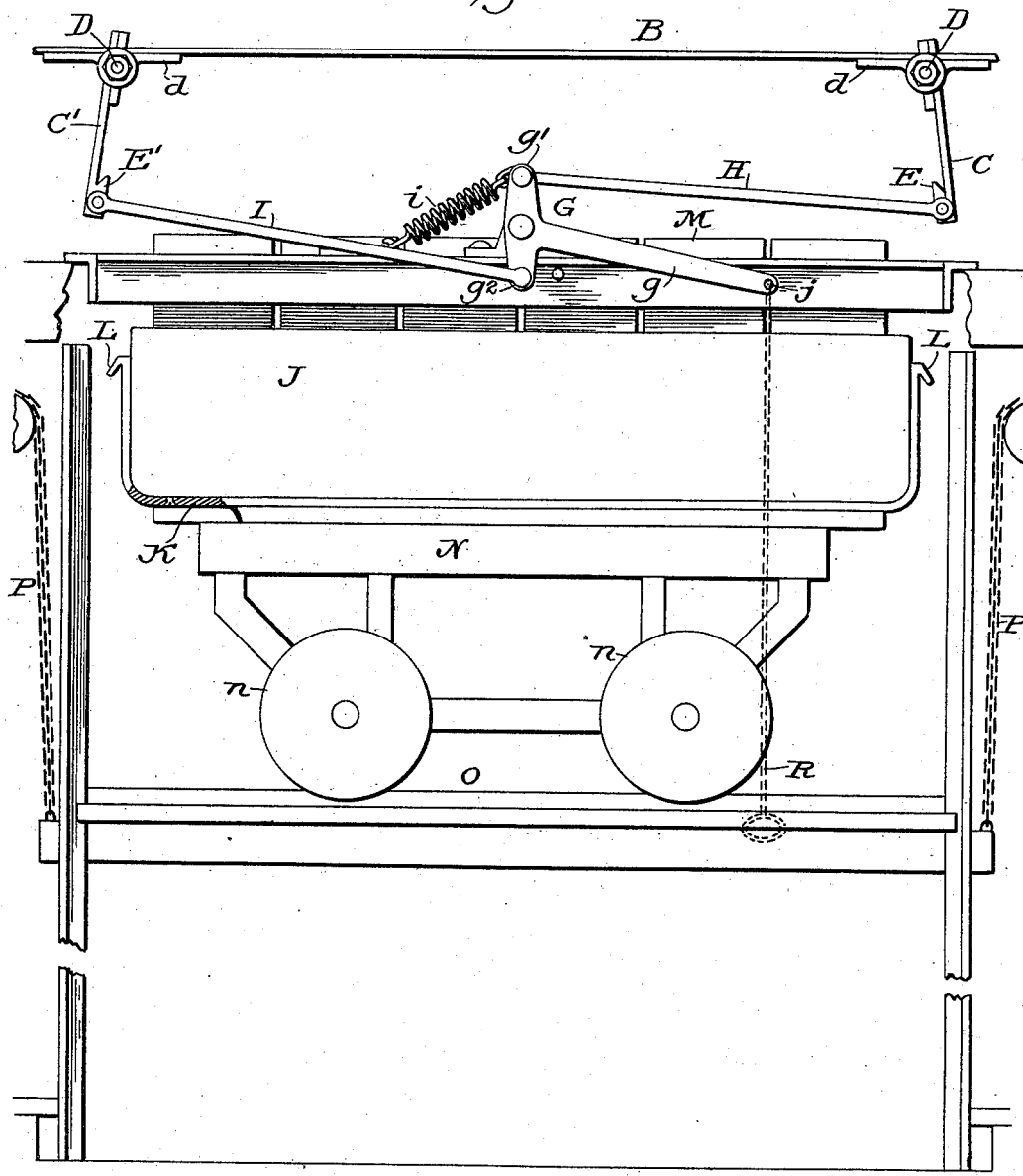

No. 647,251. Patented Apr. 10, 1900.
G. H. CONDICT.
STORAGE BATTERY SUSPENSION FOR MOTOR VEHICLES.
(Application filed July 30, 1898.)
(No Model.) 3 Sheets—Sheet 3.
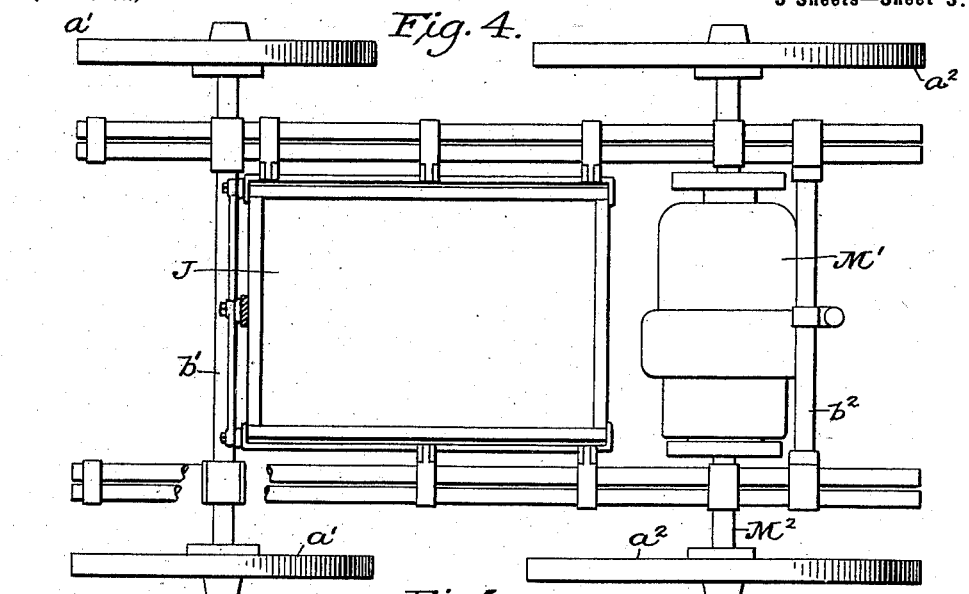
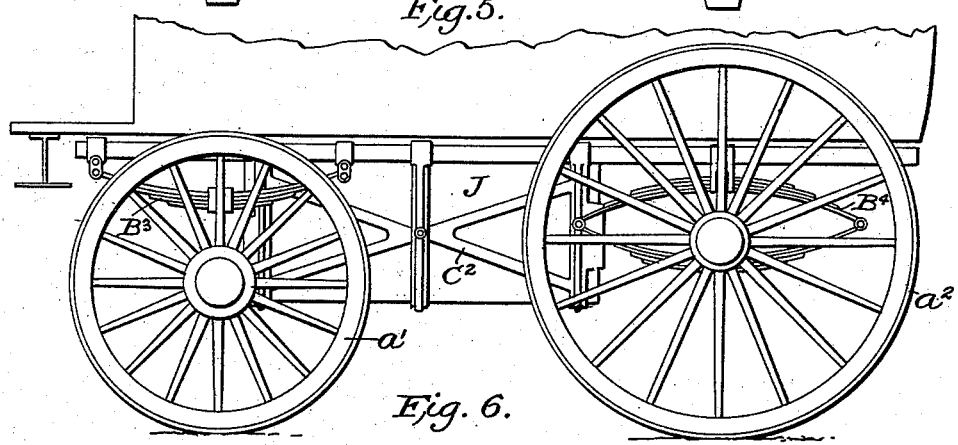
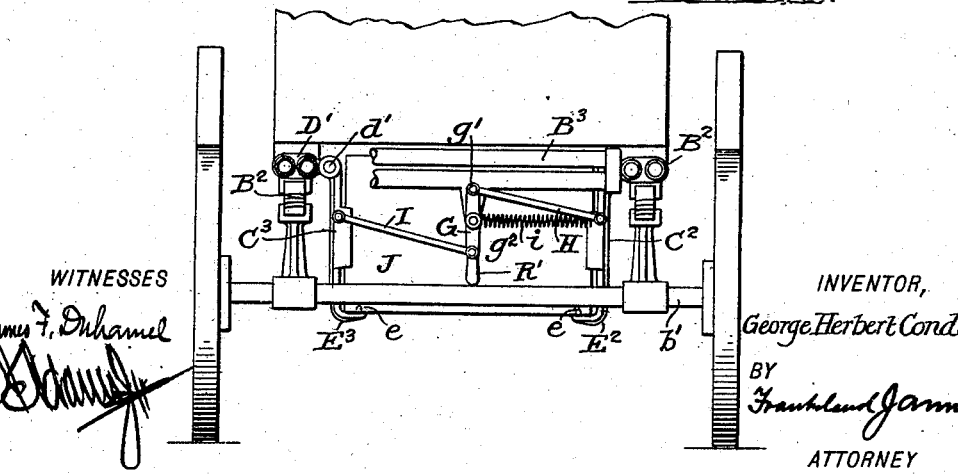
WITNESSES
INVENTOR,
George Herbert Condict,
BY
Frankland James
ATTORNEY

UNITED STATES PATENT OFFICE.

GEORGE HERBERT CONDICT, OF NEW YORK, N. Y., ASSIGNOR, BY MESNE ASSIGNMENTS, TO THE COLUMBIA AND ELECTRIC VEHICLE COMPANY, OF JERSEY CITY, NEW JERSEY, AND HARTFORD, CONNECTICUT.

STORAGE-BATTERY SUSPENSION FOR MOTOR-VEHICLES.

SPECIFICATION forming part of Letters Patent No. 647,251, dated April 10, 1900.

Application filed July 30, 1898. Serial No. 687,248. (No model.)

*To all whom it may concern:*

Be it known that I, GEORGE HERBERT CONDICT, a citizen of the United States of America, and a resident of New York, in the county of New York and State of New York, have invented certain new and useful Improvements in Storage-Battery Suspension for Motor-Vehicles, of which the following is a specification.

My invention relates to improvements in connection with the application of storage batteries to "electrically-propelled vehicles," under which term I include trucks such as are in ordinary use under electrically-propelled street-cars and the like, and also road-wagons, cabs, and all that class of electrically-propelled vehicles now known as "automobiles" or "horseless carriages."

The invention comprises a new arrangement and construction whereby the storage batteries which furnish the electric current to operate the electric motor or motors upon said trucks, wagons, or carriages are sustained in a secure and effective manner, while they are at the same time very conveniently removed for renewal.

According to my invention the batteries are arranged in one large tray, for which supporting-hooks are provided and which is so designed that it can be raised into position from below and securely supported upon the truck or vehicle, between the wheels thereof, so as to be entirely out of the way, leaving the entire top of the truck free to receive any kind of body and not in any manner interfere with the operation of its motors or mechanism. The batteries are also so low down that their weight adds steadiness and stability, and, furthermore, are in a position where they can be removed vertically downward by a suitable elevator instead of being pulled out sidewise or in any other manner, as will appear from the following description and the accompanying drawings.

Figure 1 is a plan view of an electric-railway-car truck of the four-wheel type, showing the supports of the battery-tray in position, a portion of the rear part of said truck being omitted for convenience of illustration. Fig. 2 is a side elevation of Fig. 1 with the battery-tray in position; Fig. 3, a view in elevation, showing the central portion of the truck of Figs. 1 and 2, a tray of batteries being lowered therefrom, together with a form of elevator for removing the batteries. Fig. 4 is a top plan view of a road-wagon to which the invention has been applied. Fig. 5 is a side elevation, the motor outlined in Fig. 4 being omitted. Fig. 6 is a front end view of Figs. 4 and 5.

In the drawings, Figs. 1, 2, and 3, I have illustrated a truck-frame such as is adapted to be employed to carry the body of an ordinary street-car. The motors themselves have been omitted for convenience of illustration; but the frame there shown will be referred to as a "motor-truck" frame, it being supposed to be the truck of a self-propelled or motor car.

In said drawings, A indicates the truck-frame, of which B is the top sill, upon which the car or other body is placed. The wheels are indicated at $a$ $a$, and $b$ $b$ are the axles supporting the same. In the central portion of the form of truck-frame shown, in the space between the wheels, are located two hinged supporting-frames or latch-bars C C', which extend crosswise of the truck at the ends of the central space. The latch-bars C C' are constructed of metal bars arranged to form a strong light frame. They may be solid plates, if desired, and however formed are provided with pivots D D' at the upper edges of their ends, which are hinged in bearings $d\,d'$, attached to the sill-plates B, so that their lower parts and edges can swing back and forth. Beveled strips of metal E E' are formed upon by turning up a portion of or secured to the lower edges of the latch-bars, with their edges projecting inward toward the space for the battery-tray between them.

Longitudinal bars F are connected with the lower sills B' B' or otherwise secured to the truck-frame and extend across the outer portions of the central space, and upon these bars are pivoted, one at each side, two T-headed levers G G. From the extremities of the short arms $g'$ $g^2$, which comprise the head of the lever G, extend connecting-rods H I, which are pivotally connected to the lower edges of the ends of the swinging latch-bars C C'. Retracting-springs $i$ are attached to the upper parts of the arms $g'$ and to the bars F, and by their action upon the lever G they, through said lever and the connecting-rods H I, maintain an inward pressure upon the swinging latch bars or plates C C'. Where desired, a stop $i'$ may be provided to limit the movement of the lever G and latch-bar C C' when the battery-tray has been removed.

The extending arm $g$ of the lever G is formed with an aperture $j$ in its extremity to receive a detachable hooked rod R (indicated in Fig. 3) and when drawn downward forces out the connecting-rods H I and swings the hinged latch bars or plates C C', separating their lower portions.

While I have illustrated and described my invention in connection with one form of truck and one form of vehicle, it must be understood that it is not limited thereto, but may be applied to other forms, and that the battery supporting and releasing apparatus may be used in other relations than those here shown without in any way departing from the invention J is a tray containing the batteries M, and in the construction indicated in Figs. 1, 2, and 3 the tray is strengthened and supported by a number of strong bars of channel-iron K, which extend under and sustain the floor of the tray. The extremities of the channel-irons K are turned up against the sides of the tray, Figs. 2 and 3, and their ends are turned over to form hooks L, arranged in parallel lines, so as to engage and rest upon and be supported by the beveled strips E E' upon the swinging supporting latch bars or plates C C'.

The tray of batteries is applied to the truck by being raised vertically into the space bounded by the swinging plates C C', and as said tray is raised the points of the hooks L engage and separate the plates sufficiently to allow them to pass, when the retracting-springs, tending always to draw said latch-bars together, bring the edges of the strips E E' under the hooks and hold them there, making an exceedingly strong and efficient support. The trays of charged batteries are raised into position and the trays of spent batteries are removed by means of an elevator working in a pit arranged between the rails of the track on which the truck rests, substantially as indicated in Fig. 3. The specific devices, however, for operating the elevator are not shown, as they will form the subject-matter of a separate application for Letters Patent.

The elevator, as shown, comprises a body N, mounted upon wheels or resting upon trucks upon the platform O, said platform being connected by suitable chains P with the hoisting-engine. (Not shown.)

When in position upon the body N, the tray of batteries to be supplied to a car-truck is raised by the elevator until in position in the space described, and as it reaches the desired height the hooks L upon the tray force out the latch-bars C C' until the strips E E' close in under the hooks L, by which they are firmly clamped in position through the action of springs $i$ without further attention or manipulation.

When a tray of batteries is to be removed, the elevator is run up under them and is then further moved to slightly raise the tray until the hooks L are above the edges of the strips E E', when the hooked rod R is applied to the lever $g$ by the attendant from below and the lever pulled downward. By this action connecting-rods H I and the lower ends of plates C C' are forced apart, so that the hooks L will clear the beveled strips E E' when the tray is released and may be lowered and removed by the elevator.

In the foregoing I have referred to a motor-car and a motor-truck. I will now refer to the invention in connection with a "motor-vehicle," under which term I include any kind of vehicle which does not run upon tracks, as does the truck of a motor-car.

In Fig. 4 is shown a plan view of a road-wagon which comprises front and rear axles $b'$ $b^2$ and wheels $a'$ $a^2$. A suitable electric motor M' is connected with the rear axle $b^2$ or with the wheels thereof in order to propel the vehicle, no particular form of mechanical connection being shown.

$B^2$ $B^2$ are the side frame-bars, which are mounted upon the springs $B^3$ $B^4$, interposed between them and the axles. To the bars $B^2$ $B^2$ are hinged downwardly-depending swinging frames or latch-bars $C^2$ $C^3$, similar in their mode of operation to those already described, except that the hooks sustaining the battery-trays are dispensed with and said trays are carried upon the upturned lower edges $E^2$ $E^3$ of the latch-bars $C^2$ $C^3$. The lower edges of the tray J may be faced with metal. Pins $ee$ or similar retaining devices project upwardly from the edges $E^2$ $E^3$ of the supporting-plates and enter corresponding holes in the lower edges of the tray to more effectively prevent displacement.

An elevator such as indicated in Fig. 3 may be employed to apply and remove the tray of batteries, as already described, and the arrangement of the retaining devices being more accessible can be operated directly by the attendant. The lever G is accordingly provided with an extension R', adapted to be operated by hand.

The specific construction shown in Figs. 4, 5, and 6 differs slightly, but not generically, from that previously described, as set forth, so that further detailed explanation does not seem to be required.

Various details of the apparatus hereinbefore described may obviously be modified without the exercise of invention. I therefore do not limit myself to the exact construction set forth.

In the description the terms "motor-truck" and "motor-vehicle" are both used; but so far as the present invention is concerned they are synonymous and are used only for convenience of description.

As pointed out in the claims, a "motor-vehicle" means either form or both of those set forth.

Having described my invention, what I claim is—

1. A motor-vehicle having a downwardly-open space between the carrying-wheels thereof, supporting devices at the sides of said space, and a tray adapted to fit into and be sustained by said devices in the space, and a single means for simultaneously operating a plurality of supporting devices.

2. A motor-vehicle having a downwardly-open space between the carrying-wheels thereof, supporting devices at the sides of said space and a tray adapted to fit into and be sustained by said devices in the space, and a single means for simultaneously releasing the supporting devices.

3. A motor-vehicle having a downwardly-open space between the carrying-wheels thereof, supporting devices at the sides of said space, and a tray adapted to fit into and be sustained by said devices in the space and spring-held in locked position, and a single means for simultaneously releasing the supporting devices.

4. A motor-vehicle having a downwardly-open space, a tray for containing batteries and provided with extended supports upon its exterior and adapted to be moved into said space from below, and latch-bars pivoted upon the vehicle and adapted to swing into and out of engagement with the supports upon the tray.

5. A motor-vehicle having a downwardly-open space, a tray for containing batteries and provided with extended supports upon its exterior and adapted to move into said space from below, and latch-bars pivoted upon the vehicle and adapted to swing into and out of engagement with the supports upon the tray, and a single means for simultaneously operating the latch-bars.

6. In a motor-truck a pair of swinging latch-bars, spring-held levers and connecting-rods extending therefrom to said latch-bars for holding them normally in substantially-vertical position, a battery-tray adapted to engage the latch-bars when placed between them, and means for operating the levers against the tension of their springs and separating the latch-bars simultaneously to release the tray.

7. In a motor-vehicle a pair of swinging supporting-frames, spring-held levers and connecting-rods extending therefrom to said frames for holding them normally in substantially-vertical position, a battery-tray provided with means adapted to engage the latch-bars when said tray is raised vertically between them and means for operating the levers against the tension of their springs and separating the latch-bars simultaneously to release the tray.

8. A vehicle having separated swinging latch-bars, one or more levers pivotally mounted upon the vehicle-frame and provided with oppositely-extending connecting-rods pivotally connected near the lower edges of the latch-bars, a retracting-spring connected with the lever and acting to normally hold the latch-bars toward each other and in substantially-vertical position and a lever for overcoming the spring, moving the parts and separating the latch-bars thereby releasing the tray.

9. A motor-vehicle, a storage battery, a tray for said batteries, devices depending below the floor of said vehicle about a downwardly-open space and adapted to engage the floor of said tray and hold the tray and batteries in suspended engagement with the vehicle.

10. A battery-tray having supporting devices comprising bars extending under the floor of the tray, said bars being turned up at their ends against opposite walls of the tray and provided with hooks at their extremities.

11. A battery-tray having supporting devices comprising transverse channel-bars, said bars being turned up at their ends against the sides of the tray and formed into hooks, the said hooks being arranged in parallel lines on opposite sides of the tray.

Signed by me at New York, N. Y., this 29th day of July, 1898.

GEORGE HERBERT CONDICT.

Witnesses:
FRANKLAND JANNUS,
S. G. HYATT.